US012691017B2

(12) United States Patent
Alder et al.

(10) Patent No.: US 12,691,017 B2
(45) Date of Patent: Jul. 28, 2026

(54) BED STEP

(71) Applicant: Stander, Inc., Logan, UT (US)

(72) Inventors: Kip Alder, Nibley, UT (US); Dylan Papasian, Logan, UT (US)

(73) Assignee: Stander, Inc., Logan, UT (US)

( * ) Notice: Subject to any disclaimer, the term of this patent is extended or adjusted under 35 U.S.C. 154(b) by 0 days.

(21) Appl. No.: 18/604,833

(22) Filed: Mar. 14, 2024

(65) Prior Publication Data

US 2024/0315900 A1 Sep. 26, 2024

Related U.S. Application Data

(60) Provisional application No. 63/491,901, filed on Mar. 23, 2023.

(51) Int. Cl.
*A61G 7/053* (2006.01)
*A61G 7/10* (2006.01)

(52) U.S. Cl.
CPC ........... *A61G 7/053* (2013.01); *A61G 7/1074* (2013.01)

(58) Field of Classification Search
USPC .......................................................... 5/507.1
See application file for complete search history.

(56) References Cited

U.S. PATENT DOCUMENTS 2,445,619 A 7/1948 Josephs
2,524,971 A * 10/1950 Mccormick Gray ... E06C 1/397 182/64.1
3,162,867 A 12/1964 Hoffman
3,176,322 A 4/1965 Ruth
3,668,723 A 6/1972 Bratton
D252,239 S 7/1979 Smith
6,401,280 B1 6/2002 Baker
10,034,807 B2 7/2018 Baiera et al.
D834,842 S 12/2018 Baiera et al.
10,213,353 B2 2/2019 Baiera et al.
10,456,310 B2 10/2019 Baiera
10,835,432 B2 11/2020 Baiera
11,083,655 B2 8/2021 Baiera
11,311,437 B2 4/2022 Baiera
11,850,197 B2 12/2023 Baiera
(Continued)

FOREIGN PATENT DOCUMENTS

AU 2021200718 A1 8/2021
CA 3107866 A1 8/2021
(Continued)

OTHER PUBLICATIONS

U.S. Appl. No. 29,932,843, filed Mar. 15, 2024, Alder et al.
(Continued)

*Primary Examiner* — Adam C Ortiz
(74) *Attorney, Agent, or Firm* — Dorsey & Whitney LLP

(57) ABSTRACT

Mobility assistance devices to facilitate egress from and ingress into a bed are disclosed. The devices include a step platform coupled to a handle bar and a back support bar. The step platform is supported by support legs. A height of the handle is adjustable relative to the step platform. A height of the step platform relative to the floor is adjustable by adjusting a length of the support legs extending below the step platform. The handle bar includes a horizontal portion that extends partially toward a plane extending upward from the back support bar.

22 Claims, 10 Drawing Sheets

(56) References Cited

U.S. PATENT DOCUMENTS

| | | | |
|---|---|---|---|
| D1,056,167 | S | 12/2024 | Jiang |
| D1,064,621 | S | 3/2025 | Fonseca Marcal et al. |
| D1,070,454 | S | 4/2025 | Li |
| 2009/0294214 | A1 | 12/2009 | Vosbikian et al. |
| 2014/0009917 | A1 | 1/2014 | Westermann |
| 2015/0224004 | A1 | 8/2015 | Miller |
| 2016/0374881 | A1 | 12/2016 | Baiera et al. |
| 2018/0325760 | A1 | 11/2018 | Baiera et al. |
| 2019/0159950 | A1 | 5/2019 | Baiera |
| 2019/0224061 | A1 | 7/2019 | Baiera |
| 2020/0170857 | A1 | 6/2020 | Baiera |
| 2020/0352805 | A1* | 11/2020 | Gardner ............... A61H 3/0244 |
| 2021/0045949 | A1 | 2/2021 | Baiera |
| 2022/0241126 | A1 | 8/2022 | Baiera |
| 2024/0091086 | A1* | 3/2024 | Baiera .................... A47C 12/00 |
| 2024/0315900 | A1 | 9/2024 | Alder et al. |

FOREIGN PATENT DOCUMENTS

| | | | |
|---|---|---|---|
| CN | 214341256 | U | 10/2021 |
| CN | 3087788800 | | 8/2024 |
| DE | 202021100561 | U1 | 6/2021 |
| WO | 2016209646 | A1 | 12/2016 |

OTHER PUBLICATIONS

Stander Step Stool, Amazon.ca, date first available Jun. 12, 2024 [online], Retrieved on Sep. 22, 2025 from URL: https://www.amazon.ca/Stander-Portable-Adjustable-Prevention-Activated/dp/BOD6WS4J61 (Year: 2024).

Notice of Allowance for U.S. Appl. No. 29/932,842 dated Jan. 20, 2026.

* cited by examiner

BED STEP

RELATED APPLICATIONS

This application claims priority to U.S. Provisional Application No. 63/491,901, filed on Mar. 23, 2023 and titled "BED STEP," which is hereby incorporated by reference in its entirety.

TECHNICAL FIELD

The present disclosure relates generally to mobility assistance devices. More specifically, the present disclosure relates to devices for bed ingress and egress assistance devices. More specifically, the present disclosure relates to bed step devices.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Figure 1:
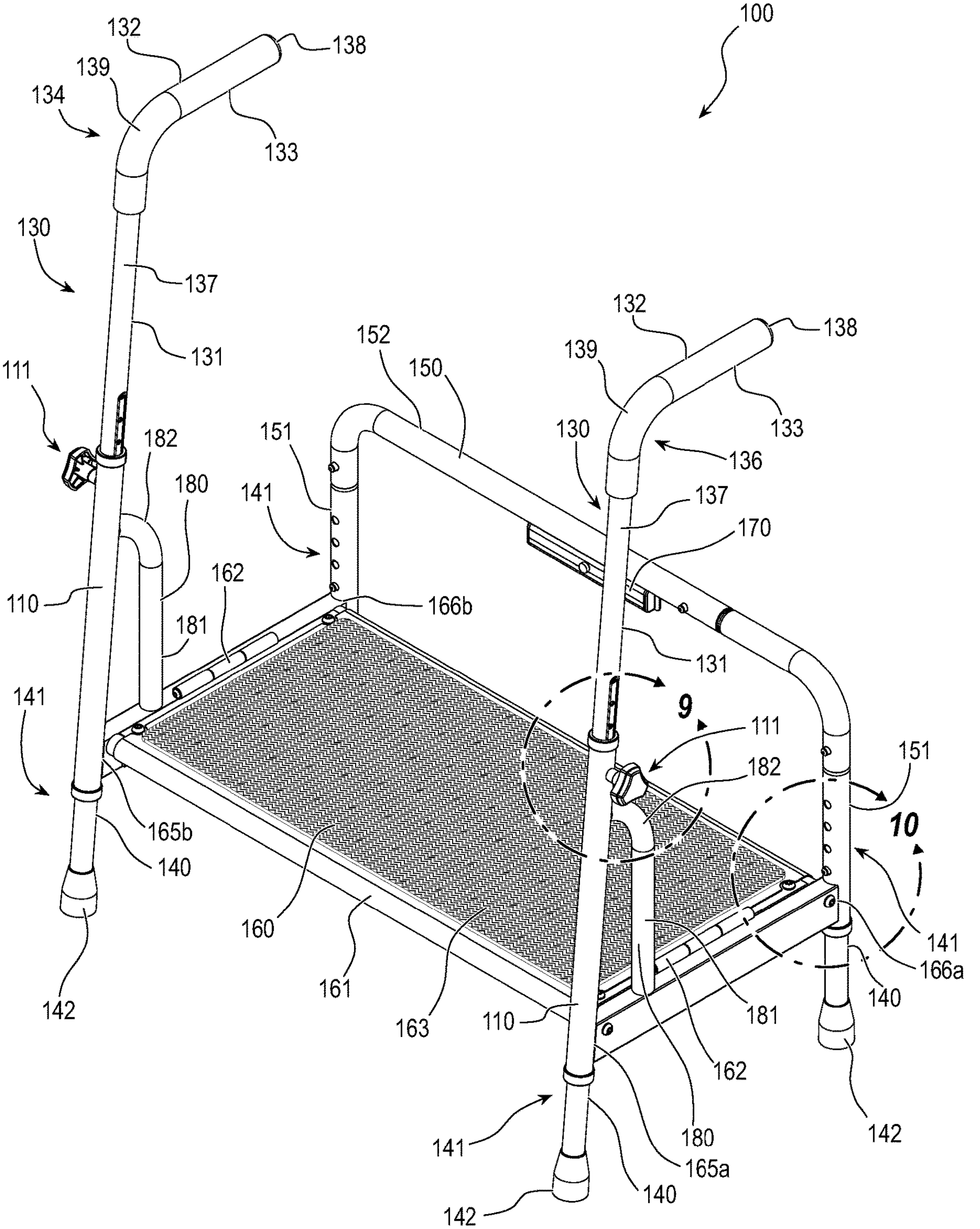
FIG. 1 is a top perspective view of a mobility assistance device according to one embodiment of the present disclosure.
Figure 2:
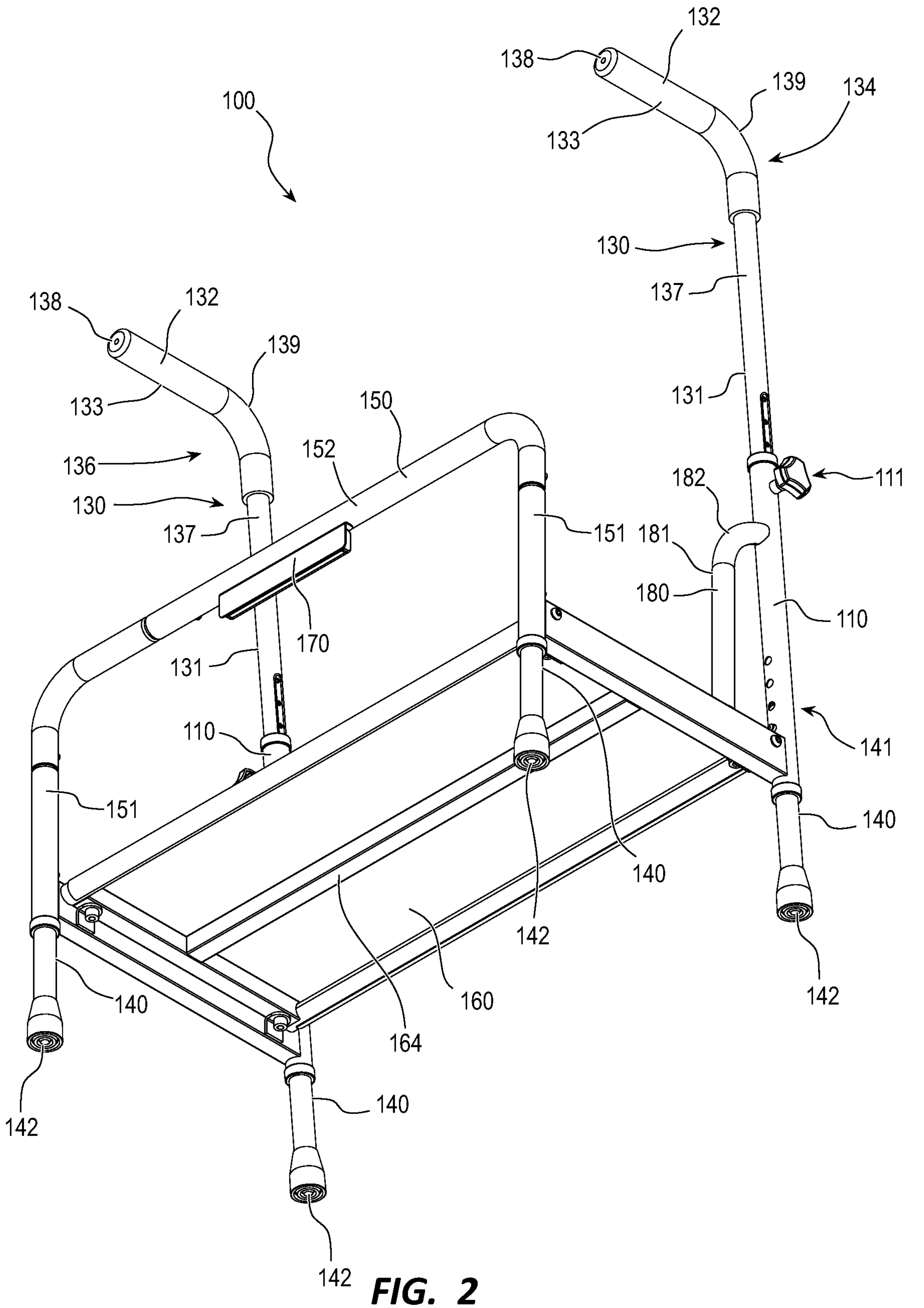
FIG. 2 is a bottom perspective view of the mobility assistance device of FIG. 1.
Figure 3:
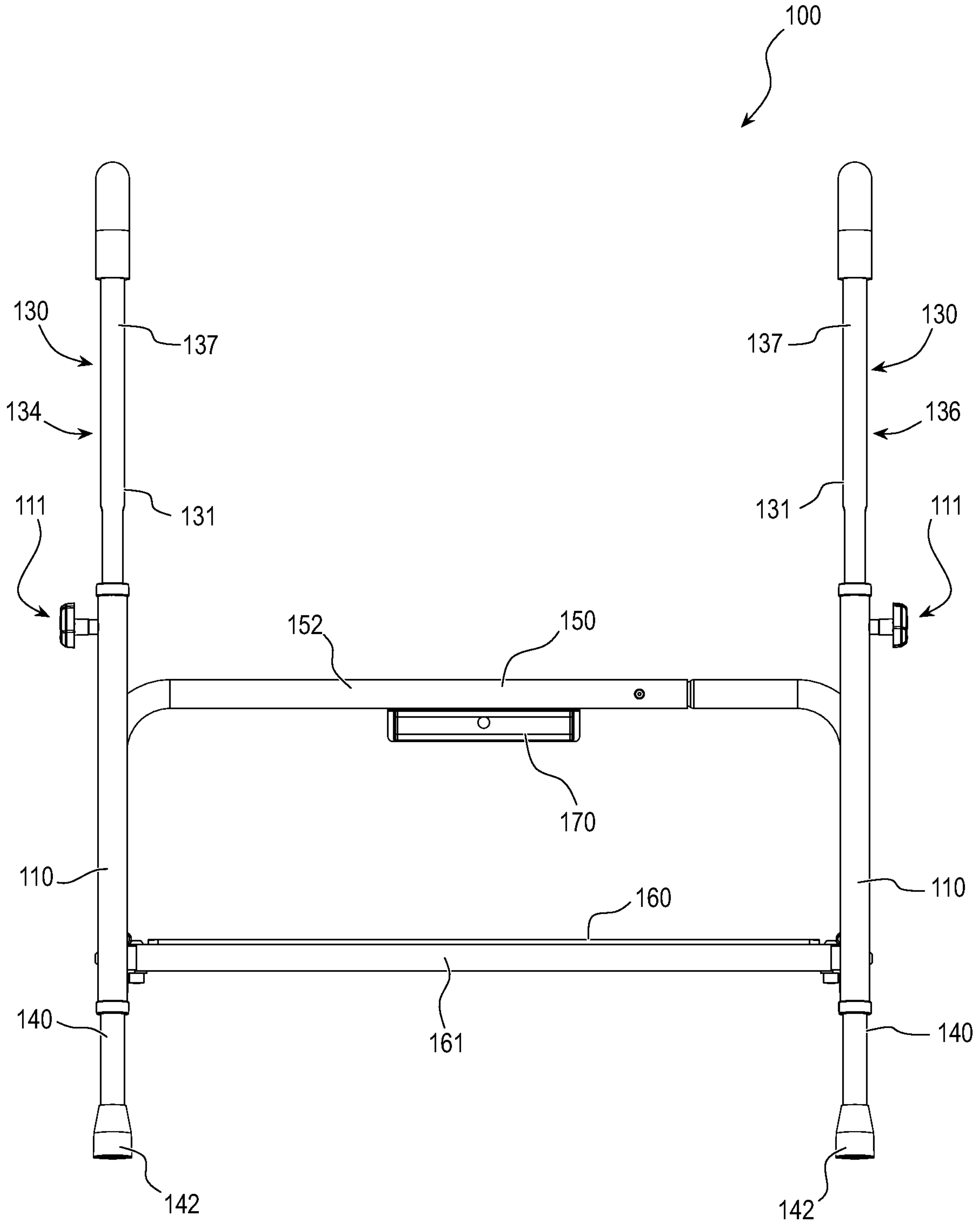
FIG. 3 is front view of the mobility assistance device of FIG. 1.
Figure 4:
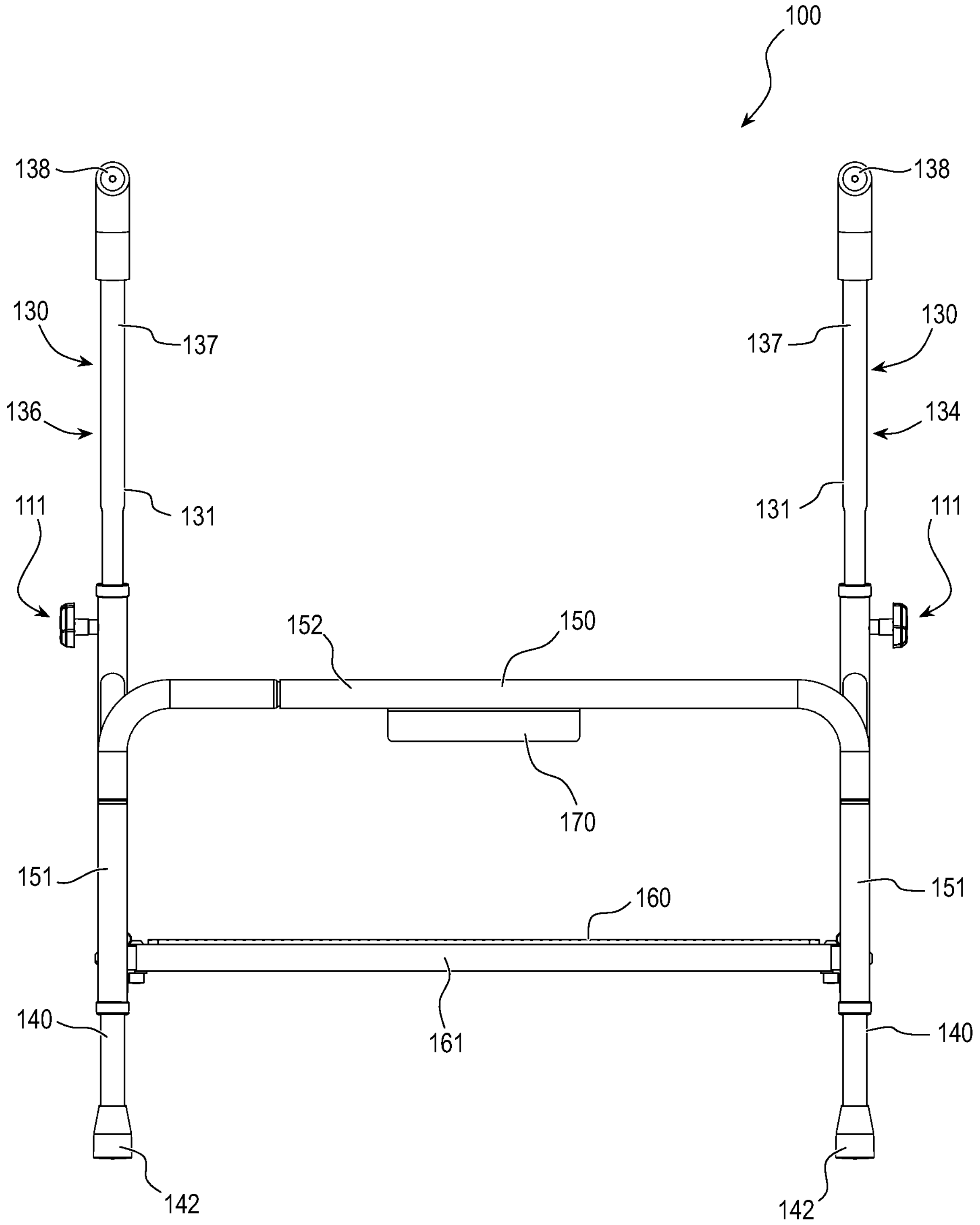
FIG. 4 is rear view of the mobility assistance device of FIG. 1.

In certain instances, a person may require assistance to get into (e.g., ingress) or get out of (e.g., egress) a bed due to a physical or other disability. The assistance may be to sit-up on the side of the bed, to stand-up at the side of the bed, and to step to or from the floor to the bed.

Embodiments herein describe mobility assistance devices to assist a person ingressing and/or egressing a bed. The device can be disposed adjacent the bed. In some embodiments within the scope of this disclosure, the devices include a step platform having four corners, at least one handle bar extending upwardly from the step platform at a front corner of the platform and extending partially toward a plane extending upward from a back of the device, and support legs extending downwardly from each of the four corners of the step platform. In other embodiments, the devices include two handle bars. In an embodiment, the devices include a telescoping tube to adjust a height of the handle bar relative to the step platform. In another embodiment, a length of the support legs extending below the step platform is adjustable to adjust a height of the step platform relative to a floor surface. In another embodiment, the devices include a brace extending between the handle bar and the step platform. In another embodiment, the devices include a handle bar height adjusting member to variably adjust the height of the handle bar. In another embodiment, the devices include leg length adjusting members to variably adjust a height of the step platform relative to the floor surface. In another embodiment, the devices include a back support bar to engage with the bed and prevent the devices from inadvertently moving under the bed.

During use of embodiments of the mobility assistance devices within the scope of this disclosure, the user may adjust the height of the step platform by adjusting the length of the support legs and/or adjust the height of the handle bar. The mobility assistance device may be disposed adjacent a user's bed such that the back support bar is disposed against the bed. Pliable feet of the support legs can prevent the device from sliding on the floor away from the bed. An opening of the device between the bed and the handle bar can prevent entrapment of the user between the device and the bed if the user falls from the bed onto the device. The handle bar can be gripped by the user to assist the user to a sitting position, to assist the user in transitioning from sitting on the bed to standing on the step platform, to assist the user while standing on the step platform, and/or to assist the user to step from the step platform to the floor surface.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment.

FIGS. 1-10 illustrate an embodiment of a mobility assistance device or bed step. FIG. 11 illustrates the mobility assistance device disposed adjacent a bed. In certain views each device may be coupled to, or shown with, additional components not included in every view. Further, in some views only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

As illustrated in FIGS. 1-10, a mobility assistance device or bed step 100 includes three broad groups of components; each group may have numerous subcomponents and parts. The three broad component groups of the bed step 100 are: a handle bar 130, a support leg 140, and a base.

As depicted in FIGS. 1-10, the base may include a step platform 160 with a tread portion 163 that is surrounded by and coupled to a platform frame 161. In another embodiment, the step platform 160 can be constructed without the platform frame 161. In some embodiments, the step platform 160 can be partially surrounded the platform frame 161. The step platform 160 is generally rectangular in shape having four corners, a right front corner 165*a*, a left front corner 165*b*, a right back corner 166*a*, and a left back corner 166*b*. However, the present disclosure is not so limited and the step platform 160 may have a variety of different shapes, such as circular, ovoid, triangular, and the like. The tread portion 163 can be formed from any suitable rigid material, such as steel or aluminum, that will support the user without fracture or substantial deflection. Other suitable materials are within the scope of this disclosure.

The platform frame 161 may further include a cross brace 164 (shown in FIGS. 2 and 8) that can be disposed across a bottom surface of the tread portion 163 to provide additional support to the tread portion 163. In the illustrated embodiment, the cross brace 164 is parallel with a front portion and a rear portion of the platform frame 161. In some embodiments, the cross brace 164 may be at an angle relative to the front and rear portions of the platform frame 161. Additionally, the cross brace 164 may facilitate thinning of the tread portion 163 to reduce weight of the bed step 100. In some embodiments the tread portion 163 may include a non-slip top surface configured to prevent slipping of a user's foot on the step platform 160. Slipping could result in death or physical injury to the user, such as bruising, broken bones, head trauma, etc. The non-slip surface may include any suitable non-slip material. For example, the non-slip surface may include a resilient or pliant material, embossing, foam, cork, anti-slip tape, etc. Other non-slip materials are within the scope of this disclosure.

In the depicted embodiment, the tread portion 163 is surrounded by and coupled to the platform frame 161. A coupling member 162 couples the tread portion 163 to the platform frame 161. The coupling member 162 can include a pin disposed through at least two knuckles with the platform frame 161 having at least one knuckle and the treat portion having at least one knuckle. In some embodiments, the knuckles between the platform frame 161 and the tread portion 163 create a hinge. The hinge may enable the telescoping tube 110 and a brace 180 (discussed below) to fold down onto the tread portion 163. The folding of all of the telescoping tubes 110 onto the tread portion 163 enables to bed step 100 to be compacted in a relatively planar configuration for storage and/or packaging. In other embodiments, the tread portion 163 may be welded or bonded to the platform frame 161. In another embodiment, the tread portion 163 and the platform frame 161 may be an integral unit.

The bed step 100 includes at least one handle bar 130 that is graspable by the user to ingress and egress the bed. In the depicted embodiment, the bed step 100 includes two handle bars, a left handle bar 134 and a right handle bar 136. In some embodiments, the handle bar 130 can be oriented perpendicular to the step platform 160. In other embodiments, the handle bar 130 may be angled from about zero degree to about 30 degrees relative to the step platform 160 toward the back portion of the bed step 100. The handle bar 130 can be a tube formed from a light weight, rigid material, such as aluminum. Other suitable materials are within the scope of this disclosure. The handle bar 130 extends upwardly from the step platform 160. The handle bar 130 can be disposed at and coupled to at least one of the front corners 165*a*, 165*b* of the step platform 160. For example, as depicted in FIG. 1, the right handle bar 136 is coupled to the right front corner 165*a* and the left handle bar 134 is coupled to the left front corner 165*b*.

In the illustrated embodiment, the handle bar 130 includes a telescoping tube or riser 110 operably coupled to a handle tube 137. The telescoping tube 110 may be coupled to one of the front corners 165*a*, 165*b* of the platform frame 161. In some embodiments, the handle tube 137 is operably coupled to the support legs 140. The handle tube 137 includes a vertical portion 131 and a horizontal portion or hand grip 132 terminating in a free end 138. The vertical portion 131 is operably coupled to the telescoping tube 110. The handle bar 130 includes a height adjusting member 111 to facilitate adjustment of a height of the hand grip 132 relative to the step platform 160.

Figure 9:
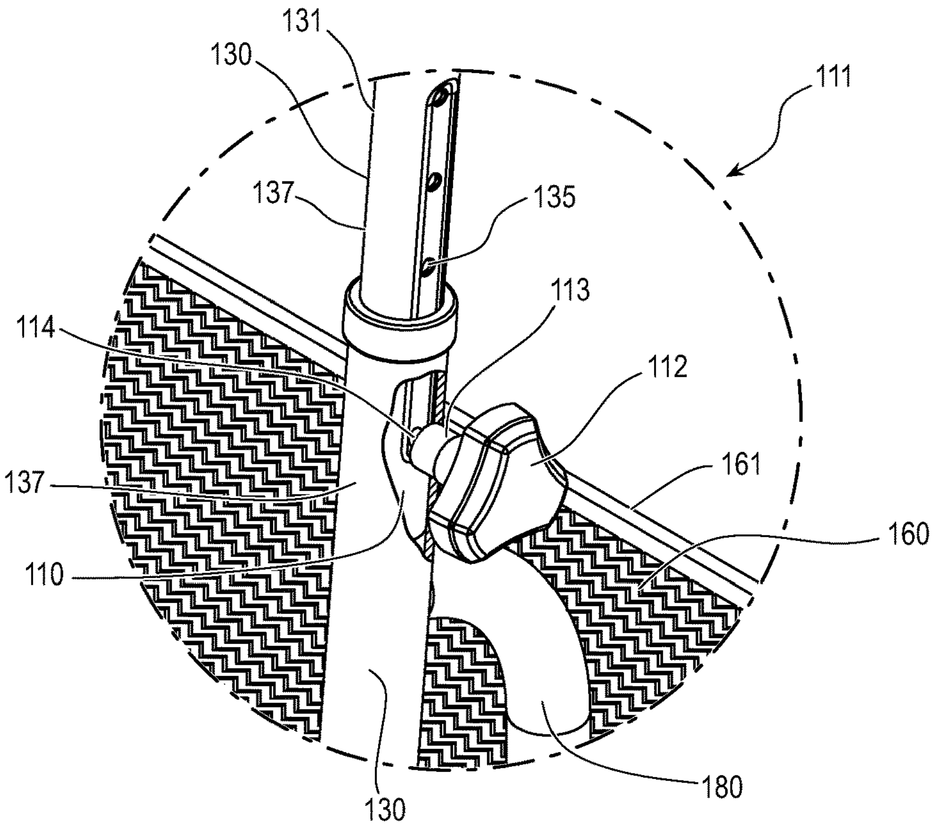
FIG. 9 is a partial cutaway view of a detailed section of the mobility assistance device of FIG. 1.

FIG. 9 is a partial cutaway view of a detailed section right front corner 165*a* of the mobility assistance device 100. As shown in FIG. 9, the height adjusting member 111 includes a locking pin 113 extending through an orifice 114 of the telescoping tube 110 and through one of a plurality of orifices 135 of the vertical portion 131 of the handle tube 137. The locking pin 113 may be reliably coupled to any of the plurality of orifices 135. A handle or knob 112 is coupled to an outward end of the locking pin 113 to facilitate removal of the locking pin 113 from the orifices 114, 135 and telescopic adjustment of the handle bar 130 in order to adjust the height of the hand grip 132 relative to the step platform 160. The left handle bar 134 and the right handle bar 136 may be independently adjustable. In other words, the left handle bar 134 and the right handle bar 136 can be set to different heights relative to the step platform 160 independent of the height of the corresponding hand bar 130. For example, the heights of the left handle bar 134 and the right handle bar 136 may be the same or the height of the left handle bar 134 may be higher or lower than the height of the right handle bar 136. When the locking pin 113 is disposed through the orifices 114, 135, the height of the handle bar 130 is locked such that a user can bare weight on the handle bar 130 when ingressing and/or egressing the bed. In certain embodiments, the locking pin 113 and the orifices 114, 135 can be threaded to allow a threading coupling of the locking pin 113 and the orifices 114, 135. Other types of height adjusting members are within the scope of this disclosure.

Figure 5:
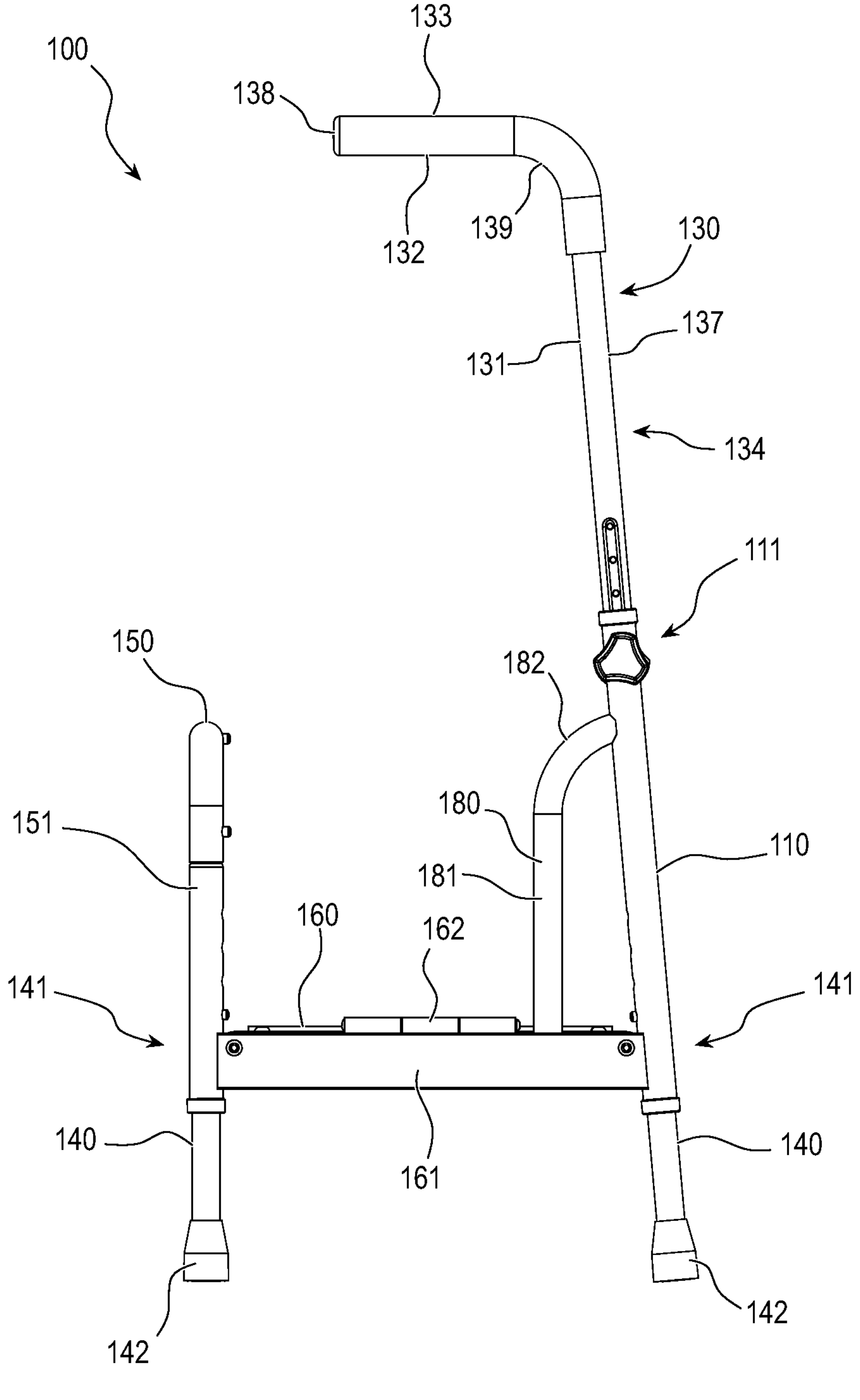
FIG. 5 is a left side view of the mobility assistance device of FIG. 1.
Figure 6:
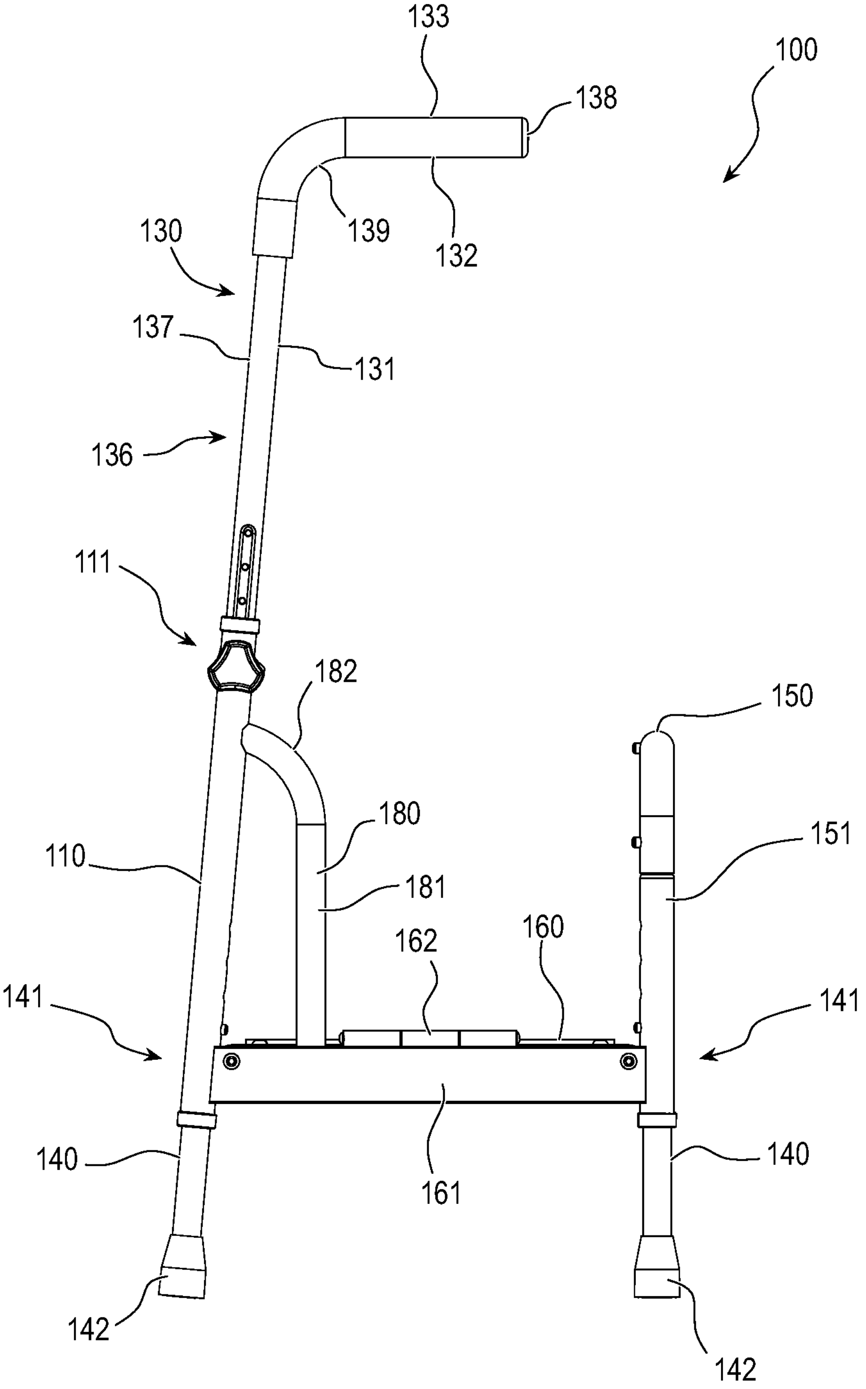
FIG. 6 is a right side view of the mobility assistance device of FIG. 1.
Figure 7:
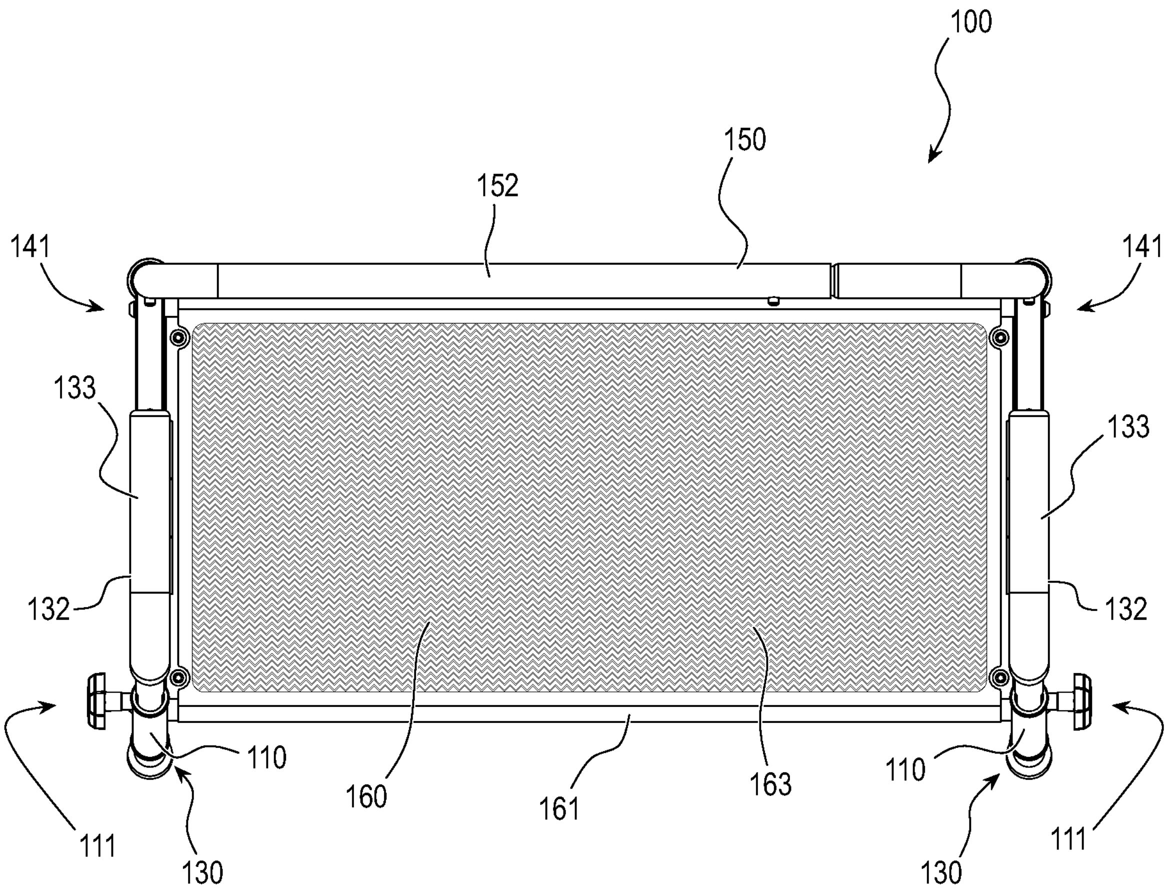
FIG. 7 is a top view of the mobility assistance device of FIG. 1.
Figure 8:
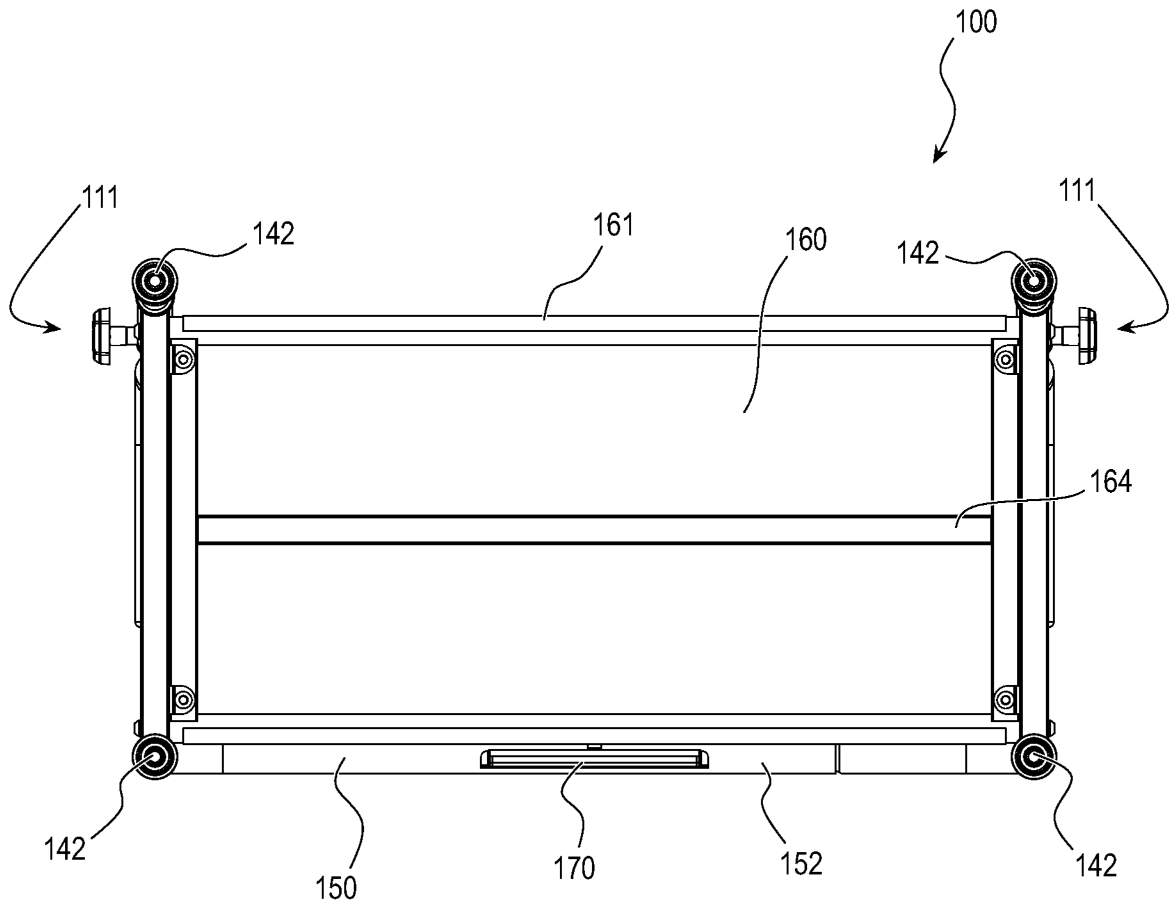
FIG. 8 is a bottom view of the mobility assistance device of FIG. 1.

As illustrated, the hand grip 132 is coupled to the vertical portion 131. In some embodiments, the vertical portion 131 and the hand grip 132 are an integral tube with a bend 139 disposed between. The hand grip 132 extends partially from a front portion of the bed step 100 to a back portion of the bed step 100 as illustrated in FIGS. 5 and 6. Said another way, the hand grip 132 extends toward a plane extending upward from the back corners 166*a*, 166*b* of the step platform 160. Said still another way, when the bed step 100 is disposed adjacent the bed, the free end 138 of the hand grip 132 extends toward the bed but does not reach, touch, contact, or intersect a plane extending upward from an edge of the bed. Said still another way, the left handle bar 134 and the right handle bar 136 do not contact the bed when a back support bar 150 is disposed in contact with the bed. The hand grip 132 may include a hand grip sleeve 133 disposed over the hand grip 132 to provide non-slip gripping of the hand grip 132. The hand grip sleeve 133 may be formed of any suitable material or structure that enhances gripability. For example, the hand grip sleeve 133 may include a compliant material, texturing, bumps, ridges, etc.

A brace 180 can extend between the handle bar 130 and the step platform 160 to prevent bending of the handle bar 130 when a downward force is applied to the hand grip 132. In other words, the brace 180 reinforces the handle bar 130. As shown in the illustrated embodiment, the brace 180 extends between and is fixedly coupled to the telescoping tube 110 and either the left or right side of the platform frame 161. The illustrated embodiment illustrates a left brace 180 disposed on a left side of the bed step 100 and a right brace 180 disposed on a right side of the bed step 100. In another embodiment, the brace 180 may extend between the handle tube 137 and the step platform 160 on either the left side or the right side of the bed step 100. Each brace 180 partially extends from the telescoping tube 110 toward the rear of the bed step 100. In other words, the brace 180 does not extend to the rear of the bed step 100. One benefit of the brace 180 not extending to the rear of the bed step 100 is that if a user were to fall off a bed onto the bed step, the user would encounter the platform 160 instead of the braces 180. This way the load from the fall could be disturbed along the platform 160 instead of concentrated on the braces 180. The brace 180 can be a tube formed from a light weight, rigid material, such as aluminum. Other suitable materials are within the scope of this disclosure. The depicted embodiment includes a vertical portion 181 coupled to the step platform 160 and a bend portion 182 coupled to the telescoping tube 110. In one embodiment, the vertical portion 181 and the bend portion 182 can formed as a unitary structure. In another embodiment, the vertical portion 181 and the bend portion 182 may be separate components assembled together.

The bed step 100 further includes a plurality of support legs 140. Each support leg 140 extends downward relative to the step platform 160 and is configured to support the step platform 160 at a desired height relative to a floor surface. Each support leg 140 can be a tube formed from a light weight, rigid material, such as aluminum. Other suitable materials are within the scope of this disclosure. In the illustrated embodiment, the bed step 100 includes four support legs 140, with one of the support legs 140 disposed at each of the four corners **165*a*, 165*b*, 166*a*, 166*b* of the step platform 160. However, the bed step 100 may have more or fewer than four support legs 140. The support legs 140 can be operably coupled to the handle bar 130 and the back support bar 150. In the illustrated embodiment, the support legs 140 disposed at the front corners 165*a*, 165*b* of the bed step 100 are operably coupled to the telescoping tubes 110. In some embodiments, a leg tip 142 is disposed over an end of the support leg 140. The leg tip 142** can be formed from a rubberized material and configured to prevent sliding of the bed step on the floor surface.

The support legs 140 include a leg length adjusting member 141 to facilitate adjustment of the height of the step platform 160 above the floor surface. In other words, the leg length adjusting member 141 allows a length of the support leg 140 extending below the step platform 160 to be adjusted.

Figure 10:
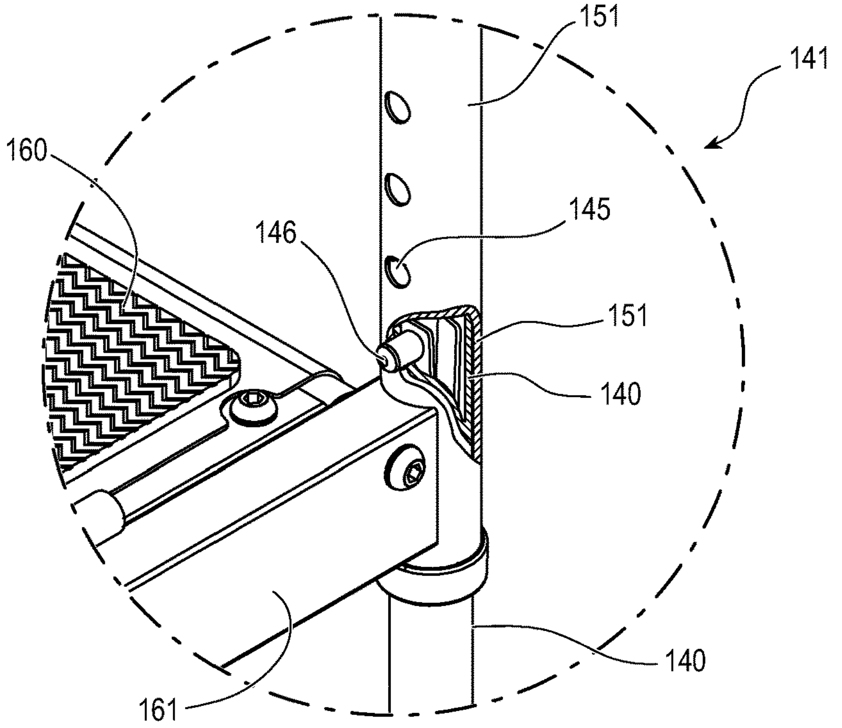
FIG. 10 is a partial cutaway view of a detailed section of the mobility assistance device of FIG. 1.
Figure 11:
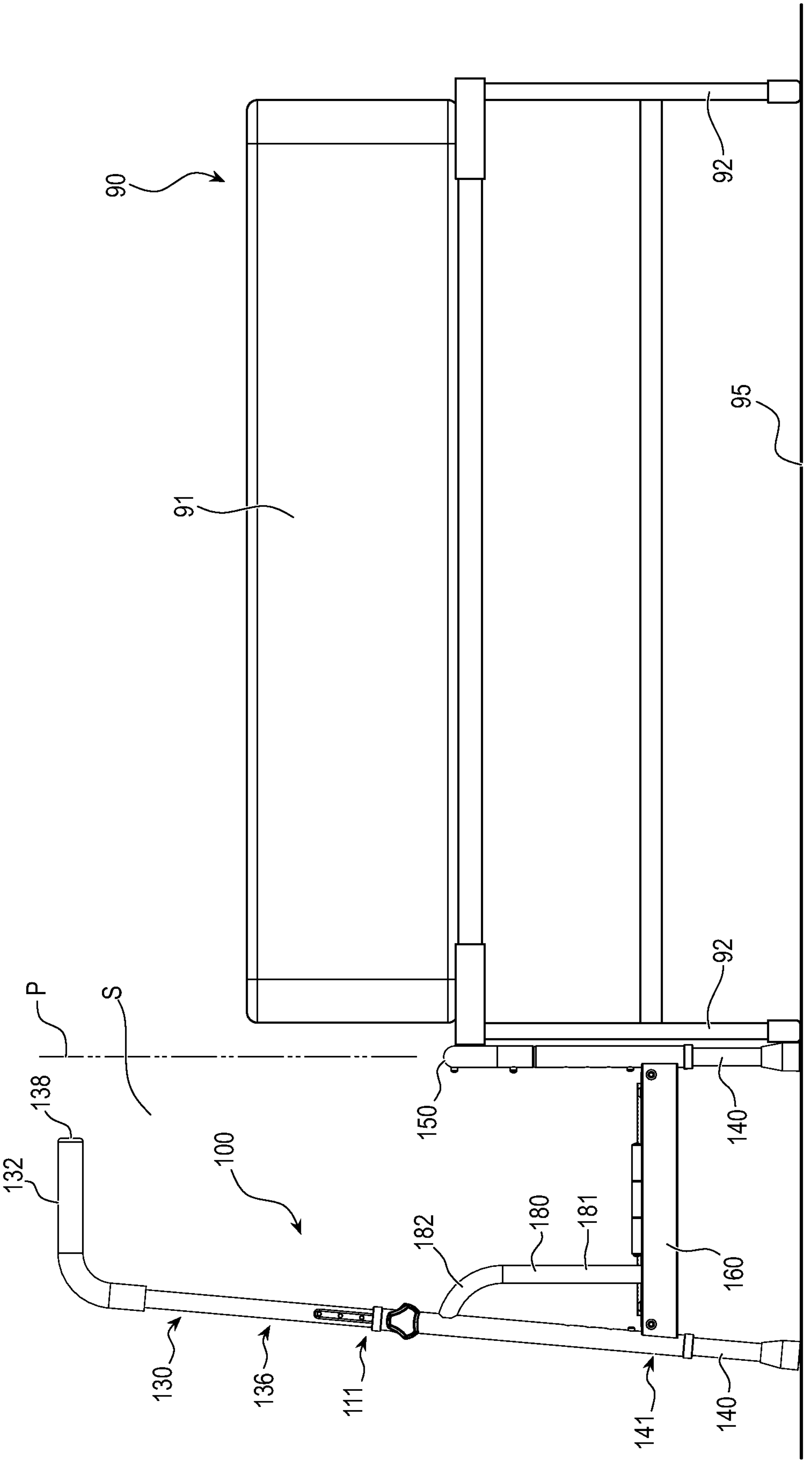
FIG. 11 is a side view of the mobility assistance device of FIG. 1 disposed adjacent a bed.

FIG. 10 illustrates a partial cutaway view of a detailed section of the right back corner **166*a* of the bed step 100. As shown in FIG. 10, the leg length adjusting member 141 can include a biased protrusion 146 extending from the support leg 140 into one of a plurality of orifices 145 of the telescoping tube 110 or the back support bar 150 where the protrusion 146 is releasably coupled to the orifice 145. For example, when the protrusion 146 is engaged with the orifice 145, the support leg 140 is locked or set at a length and when the protrusion 146 is depressed, the length of the support leg 140** can be adjusted.

The bed step 100 further includes the back support bar 150. In the illustrated embodiment, the back support bar 150 includes a pair of vertical portions 151 and a horizontal portion 152 disposed between the vertical portions 151 configured to be disposed against the bed and to prevent the bed step 100 from inadvertently moving under the bed. The back support bar 150 can be oriented substantially perpendicular relative to the step platform 160. In some embodiments the vertical portions 151 and the horizontal portion 152 may be a unitary structure. In other embodiments, the vertical portions 151 and the horizontal portion 152 may be separate elements. The back support bar 150 may include a tube formed from a light weight, rigid material such as aluminum. Other suitable materials are within the scope of this disclosure. The vertical portions 151 are coupled to the step platform 160 and operably coupled to the support legs 140 to allow length adjustment of the support legs as previously described.

In some embodiments, the bed step includes a platform step illuminator 170 that can be coupled to the horizontal portion 152 and directed toward the step platform 160. The illuminator 170 can be motion activated such that when a user foot approaches the step platform 160 the illuminator 170 is activated to provide illumination of the step platform 160. Illumination of the step platform 160 may allow the user to securely step onto the step platform 160 to help prevent an accidental fall. The illuminator 170 may include an LED light source and a battery power source.

FIG. 11 depicts the mobility assistance device or bed step 100, previously described, disposed adjacent a bed 90 where the bed 90 includes a mattress 91 and a frame 92 supporting the mattress 91. The back support bar 150 is disposed against the frame 92 such that the bed step 100 is prevented from inadvertently moving under the bed 90. In the depicted embodiment, the bed step 100 is not coupled to the bed 90, which can help prevent entrapment issues that could arise if the bed step were to be secured to the bed 90. The lengths of the support legs 140 are adjusted using the leg length adjustment members 141 to provide a desired height of the base above the floor 95 and a desired distance of the base from a top of the mattress 91. The height of the hand grip 132 is adjusted using the height adjusting member 111 to provide a desired height of the hand grip 132 relative to the step platform 160 and the top of the mattress 91. The hand grip 132 extends partially toward the bed 90 and partially toward a rear plane P extending upward from the back support bar 150. As shown, the free end 138 of the hand grip 132 does not break or intersect the plane P. Additionally, as shown the handle bar 130 does not reach, touch, or contact the bed. As shown in FIG. 11, an open space S between the mattress 91 and the bed step 100 is provided. The open space S can prevent entrapment of a user between the bed 90, including the mattress 91 and the frame 92, if the user accidentally or inadvertently falls from the bed 90.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified. For example, a method of using a mobility assistance device to egress a bed may include one or more of the following steps: gripping a grip handle; pulling on the grip handle to sit up in the bed; stepping onto a step platform; pushing down on the grip handle to stand on the step platform, and stepping onto a floor from the step platform. Other steps are also contemplated.

The phrase "coupled to" refers to any form of interaction between two or more entities, including mechanical, electrical, magnetic, electromagnetic, fluid, and thermal interaction. Two components may be coupled to each other even though they are not in direct contact with each other. For example, two components may be coupled to each other through an intermediate component.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially perpendicular" is recited with respect to a feature, it is understood that in further embodiments, the feature can have a precisely perpendicular configuration.

The terms "a" and "an" can be described as one, but not limited to one. For example, although the disclosure may recite a housing having "a stopper," the disclosure also contemplates that the housing can have two or more stoppers.

Unless otherwise stated, all ranges include both endpoints and all numbers between the endpoints.

Recitation in the claims of the term "first" with respect to a feature or element does not necessarily imply the existence of a second or additional such feature or element.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

What is claimed is:

1. A mobility assistance device, comprising:

a base comprising left and right front corners and left and right back corners;

a left front telescoping tube coupled to the left front corner and a right front telescoping tube coupled to the right front corner;

a left back telescoping tube coupled to the left back corner and a right back telescoping tube coupled to the right back corner;

a left handle bar operably coupled to the left front telescoping tube and a right handle bar operably coupled to the right front telescoping tube;

a left front support leg operably coupled to the left front telescoping tube and a right front support leg operably coupled to the right front telescoping tube; and a left back support leg operably coupled to the left back telescoping tube and a right back support leg operably coupled to the right back telescoping tube;

wherein a length of each support leg is adjustable to adjust a height of the base relative to a floor surface, wherein each of the left and right handle bars is adjustable to adjust a height of each of the left and right handle bars relative to the base, and wherein the left handle bar and the right handle bar have the same shape and are the same height.

2. The mobility assistance device of claim 1, wherein the left handle bar comprises a left vertical portion and a left horizontal portion coupled to the left vertical portion and having a free end, wherein the left horizontal portion extends partially toward a rear plane that extends upward from the left and right back corners of the base, wherein the right handle bar comprises a right vertical portion and a right horizontal portion coupled to the right vertical portion and having a free end, and wherein the right horizontal portion extends partially toward the rear plane.

3. The mobility assistance device of claim 1, wherein the left and right handle bars do not contact a bed when the back support bar is disposed in contact with the bed.

4. The mobility assistance device of claim 1, wherein the left handle bar and the right handle bar are independently adjustable.

5. The mobility assistance device of claim 1, further comprising:

a left front handle bar height adjusting member to lock the height of the left front handle bar relative to the base; and a right front handle bar height adjusting member to lock the height of the right front handle bar relative to the base.

6. The mobility assistance device of claim 5, wherein each of the left front handle bar height adjusting member and the right front handle bar height adjusting member comprises a locking pin releasably coupled to at least one of a first plurality of orifices defined in each of the left front telescoping tube and the right front telescoping tube.

7. The mobility assistance device of claim 6, wherein the locking pin comprises a knob coupled to the locking pin.

8. The mobility assistance device of claim 1, further comprising:

a left front support leg length adjusting member comprising a biased protrusion operably coupled to the left front support leg configured to engage with one of a plurality of orifices defined by the left front telescoping tube;

a right front support leg length adjusting member comprising a biased protrusion operably coupled to the right front support leg configured to engage with one of a plurality of orifices defined by the right front telescoping tube;

a left back support leg length adjusting member comprising a biased protrusion operably coupled to the left back support leg configured to engage with one of a plurality of orifices defined by the left back telescoping tube; and a right back support leg length adjusting member comprising a biased protrusion operably coupled to the right back support leg configured to engage with one of a plurality of orifices defined by the right back telescoping tube.

9. The mobility assistance device of claim 1, further comprising a back support bar extending between and operably coupled to the left back and right back telescoping tubes.

10. The mobility assistance device of claim 1, wherein the base comprises a platform step coupled to a platform frame.

11. A bed step device, comprising:

a base;

a plurality of support legs operably coupled to the base; and a first handle bar operably coupled to a front portion of the base, wherein the first handle bar comprises a free end that extends away from the base and partially extends toward a rear plane of the bed step device, the rear plane extends from a rear portion of the base, and wherein the first handle bar is tilted toward the rear plane relative to the base where the first handle bar is operably coupled to the base.

12. The bed step device of claim 11, wherein the first handle bar comprises a vertical portion and a hand grip portion terminating in the free end.

13. The bed step device of claim 11, further comprising a back support bar that extends between opposing rear corners of the base, wherein the rear plane extends from the back support bar.

14. The bed step device of claim 13, wherein the first handle bar does not contact a bed when the back support bar is disposed in contact with the bed.

15. The bed step device of claim 11, further comprising a second handle bar operably coupled to another front corner of the base, wherein the second handle bar comprises a free end that extends away from the base and partially extends toward the rear plane of the bed step device.

16. The bed step device of claim 11, wherein a height of the base is adjustable relative to a floor surface on which the bed step device is disposed.

17. The bed step device of claim 11, wherein a height of the first handle bar is adjustable relative to the base.

18. The bed step device of claim 11, further comprising a support brace extending between the first handle bar and the base, wherein the support brace extends toward the rear portion of the base.

19. A bed egress and ingress assistance device, comprising:

a base that comprises a left front corner and a right front corner and a left back corner and a right back corner;

a left front riser coupled to the left front corner and a right front riser coupled to the right front corner;

a left back riser coupled to the left back corner and a right back riser coupled to the right back corner;

a left handle bar operably coupled to the left front riser and a right handle bar operably coupled to the right front riser;

a left front support leg operably coupled to the left front riser and a right front support leg operably coupled to the right front riser;

a left back support leg operably coupled to the left back riser and a right back support leg operably coupled to the right back riser;

a left support brace disposed between the left front riser and a left side of the base and a right support brace disposed between the right front riser and a right side of the base; and a back support bar extending between and operably coupled to the left back and right back risers, wherein each of the left and right handle bars is adjustable to adjust a height of each of the left and right handle bars relative to the base, and wherein a length of each of the left handle bar and the right handle bar are tilted toward a rear plane of the bed step device.

20. The bed egress and ingress assistance device of claim 19, wherein the left handle bar comprises a left vertical portion and a left horizontal portion coupled to the left vertical portion and having a free end, wherein the left horizontal portion extends partially toward a rear plane that extends upward from the left and right back corners of the base, wherein the right handle bar comprises a right vertical portion and a right horizontal portion coupled to the right vertical portion and having a free end, and wherein the right horizontal portion extends partially toward the rear plane.

21. The mobility assistance device of claim 2, wherein the left and right handle bars are tilted toward the left rear corner and the right rear corner relative to the base where the left and right handle bars are operably coupled to the base.

22. The mobility assistance device of claim 20, wherein the left and right handle bars are tilted toward the left rear corner and the right rear corner relative to the base where the left and right handle bars are operably coupled to the base.

* * * * *